US010589421B2

(12) United States Patent
DeCandia

(10) Patent No.: US 10,589,421 B2
(45) Date of Patent: Mar. 17, 2020

(54) MECHANICAL ENERGY TRANSFER SYSTEM

(71) Applicant: Douglas H. DeCandia, San Diego, CA (US)

(72) Inventor: Douglas H. DeCandia, San Diego, CA (US)

( * ) Notice: Subject to any disclaimer, the term of this patent is extended or adjusted under 35 U.S.C. 154(b) by 830 days.

(21) Appl. No.: 14/993,918

(22) Filed: Jan. 12, 2016

(65) Prior Publication Data

US 2016/0199980 A1    Jul. 14, 2016

Related U.S. Application Data

(60) Provisional application No. 62/102,307, filed on Jan. 12, 2015.

(51) Int. Cl.

| *B25J 9/10* | (2006.01) |
|---|---|
| *F16D 55/00* | (2006.01) |
| *F16D 67/06* | (2006.01) |
| *F16D 125/66* | (2012.01) |
| *F16D 63/00* | (2006.01) |
| *F16D 51/00* | (2006.01) |
| *F16D 121/18* | (2012.01) |

(52) U.S. Cl.
CPC ............ *B25J 9/10* (2013.01); *F16D 51/00* (2013.01); *F16D 55/00* (2013.01); *F16D 63/008* (2013.01); *F16D 67/06* (2013.01); *F16D 2121/18* (2013.01); *F16D 2125/66* (2013.01); *Y10S 901/19* (2013.01); *Y10S 901/21* (2013.01)

(58) Field of Classification Search
CPC ............ B25J 9/10; B60L 7/00; F16D 27/00
See application file for complete search history.

(56) References Cited

U.S. PATENT DOCUMENTS

| 3,734,245 A | 5/1973 | Hubbard |
|---|---|---|
| 4,663,925 A * | 5/1987 | Terada ............... A01D 46/24 382/153 |
| 2004/0256192 A1 | 12/2004 | Hill et al. |
| 2008/0142327 A1 | 6/2008 | Shchokin et al. |
| 2012/0053000 A1* | 3/2012 | Ohm ..................... F16H 3/54 475/149 |
| 2013/0002050 A1 | 1/2013 | Knestel et al. |
| 2015/0300427 A1* | 10/2015 | Ueda ................... F16D 27/112 192/84.96 |

(Continued)

FOREIGN PATENT DOCUMENTS

CN          104210805 A          12/2014

OTHER PUBLICATIONS

Cable Car Museum; http://www.cablecarmuseum.org/mechanical070714.html; Admitted prior art; printed from website Jul. 6, 2016; 1 page.

*Primary Examiner* — David M Fenstermacher
(74) *Attorney, Agent, or Firm* — Avyno Law P.C.

(57) ABSTRACT

The present invention relates to a mechanical energy transfer system that comprises a moving member that imparts energy to an engaging member as a friction force is applied to the moving member. The moving members may be rotating plates/disks, belts, or drums/cylinders. Upon engagement of the moving members by the engaging members, movement is transferred to the engaging members. Movement transfer may occur through the application of any frictional force, such as a magnetic force or a mechanical force.

15 Claims, 15 Drawing Sheets

(56) References Cited

U.S. PATENT DOCUMENTS

2017/0067516 A1* 3/2017 Fujisawa .............. F16D 27/02
2018/0119610 A1* 5/2018 Hornbrook ........... F02B 39/12
2019/0072136 A1* 3/2019 Nakamura ........... F16D 27/112

* cited by examiner

MECHANICAL ENERGY TRANSFER SYSTEM

CROSS-REFERENCE TO RELATED APPLICATIONS

This application claims priority of U.S. application Ser. No. 62/102,307, filed on Jan. 12, 2015, titled SYSTEM AND METHOD FOR TRANSFER MECHANICAL ENERGY, which application is incorporated by reference in this application in its entirety.

BACKGROUND OF THE INVENTION

1. Field of the Invention

This invention relates generally to robotics and more particularly to robotic motion.

2. Related Art

Traditionally, robots and other mechanical devices use electronic motors or hydraulic cylinders to transfer mechanical motion to appendages of robots for movement of arms and legs. Examples of such motors are servos or stepper motors, which are very accurate electric motors that are digitally controlled. A drawback with using servos or stepper motors in a robotic design is the introduction of multiple points of possible failure. Similarly, hydraulic cylinders may be employed in designs or robotic devices to move appendages and locomotion. A limitation to such designs is extreme pressures (like deep under the surface of the ocean) or extreme temperatures adversely affecting the operation hydraulic systems.

Additionally, when considering a large number of degrees of freedom, such as in complex mechanical articulation systems like hands, the inherent inefficiencies of motors become a major design issue. Motors require gaps between the rotor and stator, which creates a mechanical energy transfer loss as a square of the distance between the rotor and stator. Further, motors require a tangential force to be applied to 'pull' the rotor from one stator coil to the next, which is an additional inefficiency inherent in the tangent angle between a rotor coil and the active stator coil and further increasing distance. The drawbacks occur regardless of a linear or circular configuration of a motor, are inherent for every motor type, and cannot be solved through motor re-design. Additional, the by-product of this inefficiency is heat, which further degrades the efficiency of the magnetic field and the motor.

SUMMARY

The present invention relates to systems and methods for transferring mechanical energy of moving members to engaging members, such as carriers or clamps, using friction. The moving members may be rotating plates/disks, belts, or drums/cylinders. Upon engagement of the moving members by the carriers, movement is transferred to the carriers. The engagement of the carriers with the moving members may occur through the application of any frictional force, which may be created via a magnetic force, much like a solenoid, or mechanical force, similar to a break pad being applied or engaged with the rotating plate or belt.

Alternatively, the surface characteristics of the moving surface may be modified to change the usable frictional force, for example, through the use of lubricants and/or electrostatic processes, or a change in the resistance to the motion of the moving member (e.g., belt), as you would expect in hysteresis, or physical deformation of components.

Other devices, apparatus, systems, methods, features and advantages of the invention are or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention.

DETAILED DESCRIPTION

Figure 1:
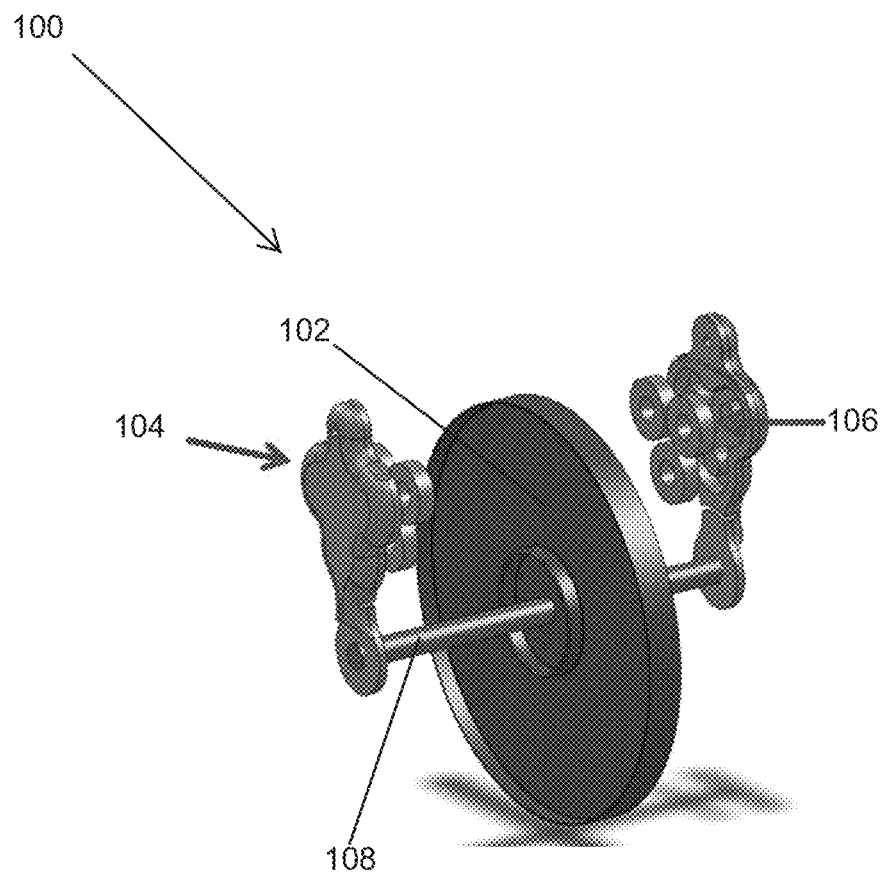
FIG. 1 is a perspective view of one example of a mechanical energy transfer system of the present invention using a disk arrangement.

As illustrated in FIGS. 1-15 below, the mechanical transfer system 100, 300, 500, 700, 900, 1000 includes a rotating or moving member 102, 302, 702, 1002 such as a disk 102, belt 702, 1002 or cylinder/drum 302 that may be rotated via an indirect or direct connection to a motor (not shown), such as an electrical motor or similar power transference device (steam, gas, or chemical motor). As the moving member rotates 102, 302, 702, 1002, engaging members, also referred to herein as carriers or clamps 104, 304, 704, 1004 may be designed to engage the rotating member 102, 302, 702, 1002, which in one example, is a rotating disk 102. In that example, when engagement occurs with the rotating disk 102, the carrier 104 is then moved by force on the disk 102. The more force that is exerted by the engagement member 104, 304, 704, 1004 to the moving member 102, 302, 702, 1002, the more friction is applied to allow the movement of the engagement member 104, 204, 704, 1004. As can be seen in the below illustrated examples, more than one engaging member 104, 304, 704, 1004 can engage the moving member 102, 302, 702, 1002 at one time, each with variable force, to move independently of one another, within predefined mechanical limits to avoid contact with one another.

Figure 2:
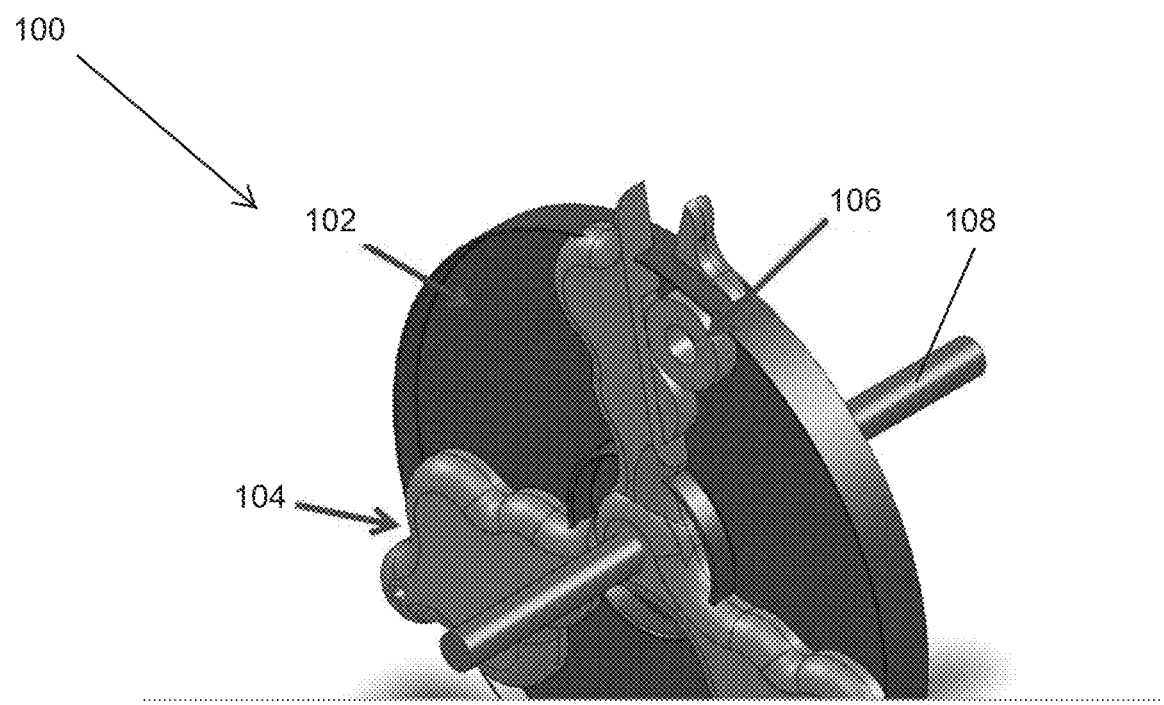
FIG. 2 illustrates an assembled view of the disk arrangement of FIG. 1.

FIG. 1 is a side perspective view of one example of a mechanical energy transfer system 100 of the present invention utilizing a disk arrangement. FIG. 2 illustrates an assembled view of the disk arrangement of FIG. 1, as it would appear during operation.

Figure 15:
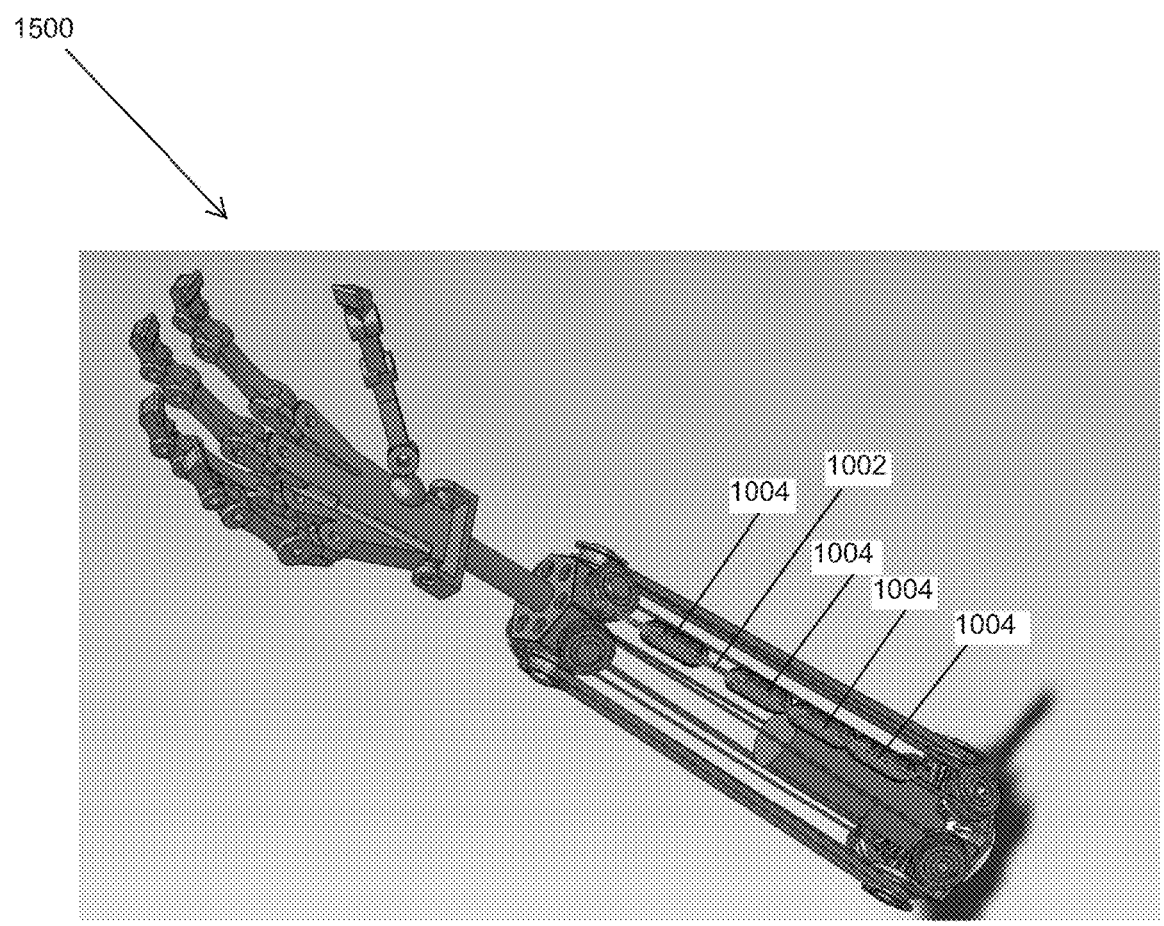
FIG. 15 illustrates an example of a belt arrangement mechanical transfer system as it may appear in use.

As illustrated in FIGS. 1 and 2, the mechanical energy transfer system 100 includes a disk 102, having a central axis 108, and having two opposing engagement members 104 (or carriers) for engagement with the disk 102. The carriers 104 include coils 106 for applying electro-magnetic force to the disk 102 when in motion to transfer movement to the carrier 104 in a controlled manner. The carriers 104 may then, in robotic applications, be connected to appendages, such as gripping mechanisms to impart movement on the gripping mechanisms (FIG. 15).

As illustrated, the force that is used when engaging the disk 102 by the carrier 104 may be generated via an electro-magnetic force, much like a solenoid. The more current or charge put through the coils 106, the greater the force exerted by the coils 106. Thus, the adjustment of the engagement via electronically controlled electro-magnetic fields enables the movement of the appendages, grips or other controls directly or indirectly attached or connected to the carrier 104 to be varied, for example, to move slightly, to move a greater amount and/or to exert a gentle or firm amount of grip may all be controlled by the applied electromagnetic force. Assuming a robotic hand application, each finger or digit of a robot may have an independent carrier 104 that is individually controlled to engage the disk 102 to facilitate movement of the finger or digit.

If a light grip or small movement is desired, engagement of the disk 102 by the carrier 104 will be executed with minimal force to allow for slippage on the disk 102. If a tight grip or greater movement is desired, more force is applied to disk 102 by the carrier member 104 via, in the illustrated example, an electro-magnetic coupling device (much like a solenoid) resulting in a firmer engagement of the carrier 104 with the disk 102. The disk 102 may also adjust its speed to provide high reaction or speed, or lower reaction and greater torque. The result is a highly variable set of actions and behaviors based on disk 102 speed, strength of magnetic force, duration of force applied, location of the engagement on the disk 102 (further away from the center, the faster the disk is traveling) and properties of the interaction between the disk 102 and the carrier 104 such as the coefficient of friction between the carrier 104 and the disk 102, which can also be varied by the use of a friction plate (See FIG. 7) made of various materials, as needed to most effectively control the coefficient of friction for each application.

While FIG. 1 illustrates a double coil arrangement with coils 106 on both sides of the disk 102 that are attracted on one another when charged, the disk arrangement may be designed such that the coils 106 are attracted to the disk 102 itself, or to a plate (similar to the plate in FIG. 5) positioned on the opposite side of the disk 102. Further, as noted above, each carrier 104 can move independently or together, as needed or desired for the requirements of the application.

Figure 3:
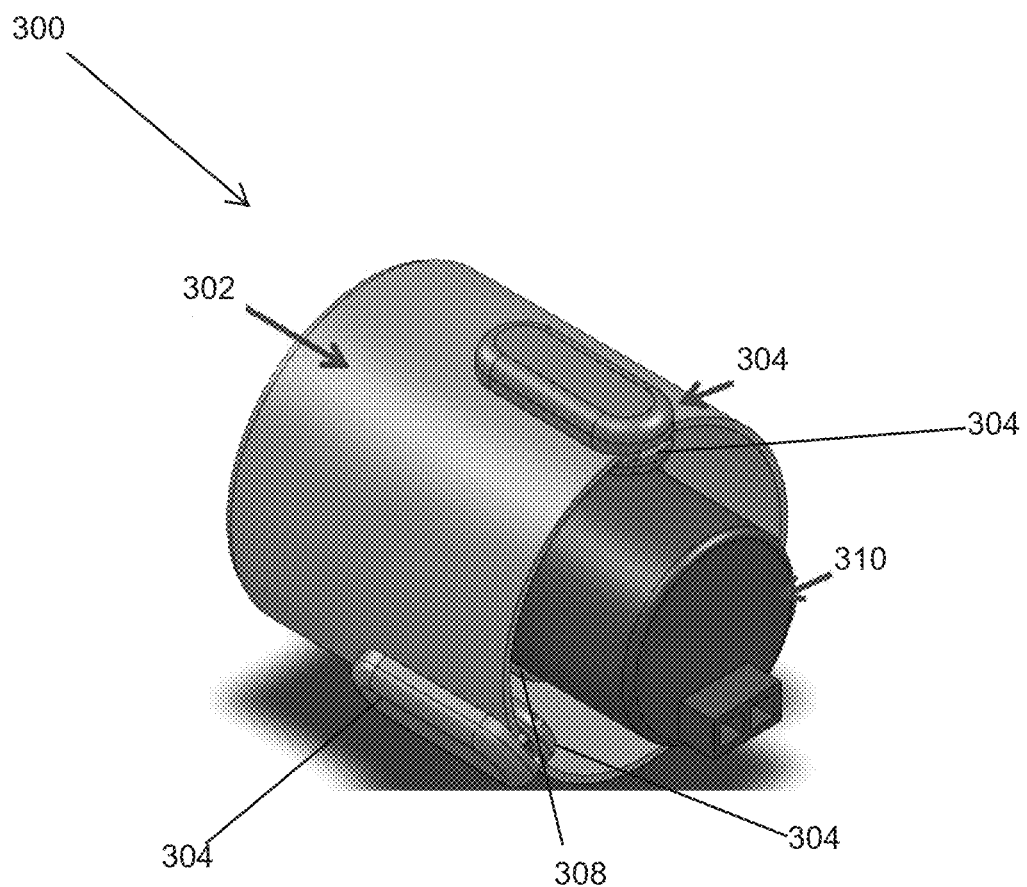
FIG. 3 illustrates another her example of a mechanical transfer system using a cylinder arrangement comprising a drum and motor.
Figure 4:
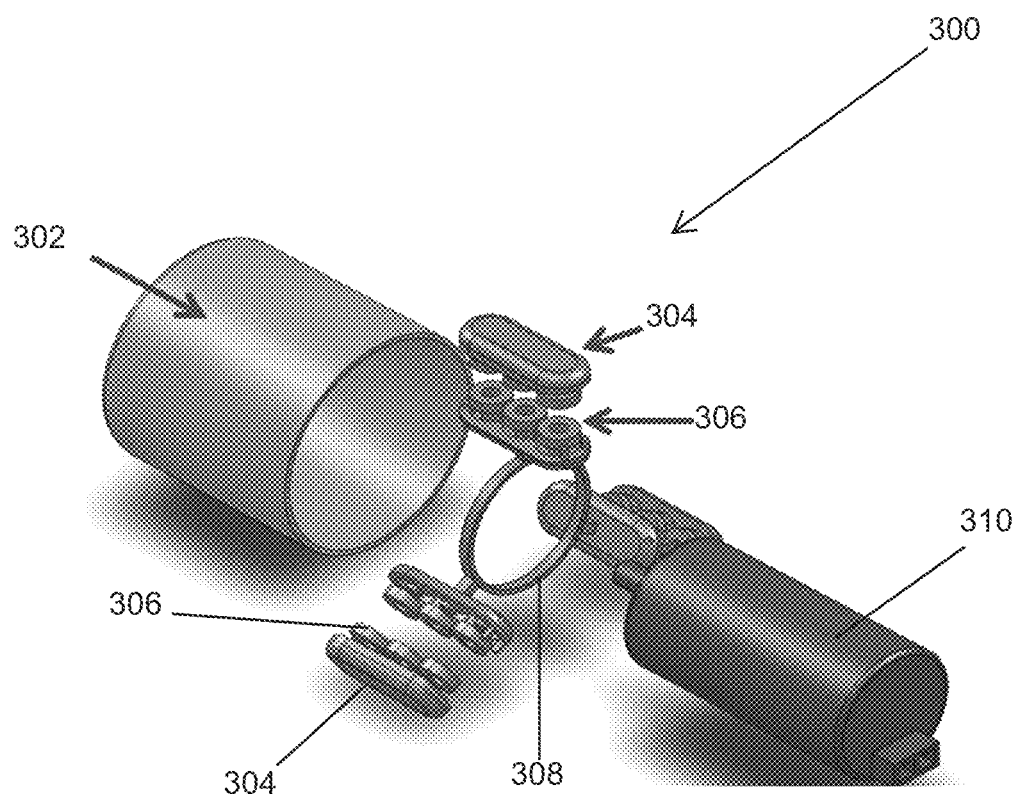
FIG. 4 is an exploded view of one example of the cylinder arrangement of FIG. 3.

Similar approaches may be used with cylinders or drums 302, as shown in connection with FIGS. 3-6 below. In particular, FIG. 3 illustrates another example of a mechanical transfer system 300 utilizing a cylinder arrangement comprising a drum 302 and motor 310. FIG. 4 is an exploded view of the cylinder arrangement of FIG. 3.

As illustrated in FIGS. 3 & 4, the cylinder 302 has a plurality of magnets or coils 306 that may be encapsulated into a subassembly or carrier 304 and secured to the outside of the cylinder 302. A motor 310 may be positioned inside the cylinder 302. The motor 310 may engage magnets 306 positioned on the inside of the cylinder 302 (which may be electro magnets). When motor 310 turns the magnets 306 on the inside of the cylinder 302 (inner magnets), the magnets 306 of the carrier 304 on the outside of the cylinder 302 (outer agnets) engage with the inner magnets 306 via magnetic force and cause the cylinder 302 to rotate. If the inner magnets 306 are electromagnets, the amount of current in the electromagnet controls the force of the coupling with the magnets 306 on the outside of the cylinder 302. It is noted, that in practice, coupling means (cable, wire rods, or other memberswould connect between carriers 304 on the outside of the cylinder 302 and other parts of a robot or mechanical device to impart motion from the carriers 104 on various parts of the robot or mechanical device.

FIG. 4 shows a detailed view of the magnets 306 engaged on the inside and outside of the cylinder 302. FIG. 4 best illustrates that the inner magnets 306 may be coupled to a ring 308 that is further coupled to the electronic motor or servo 310. FIG. 4 illustrates a double-coil cylindrical arrangement, having coils 306 on both sides of the cylinder 302 that are attracted to one another when charged and cause the movement of the cylinder 302. The more three applied, the great the movement of the cylinder 302.

Figure 5:
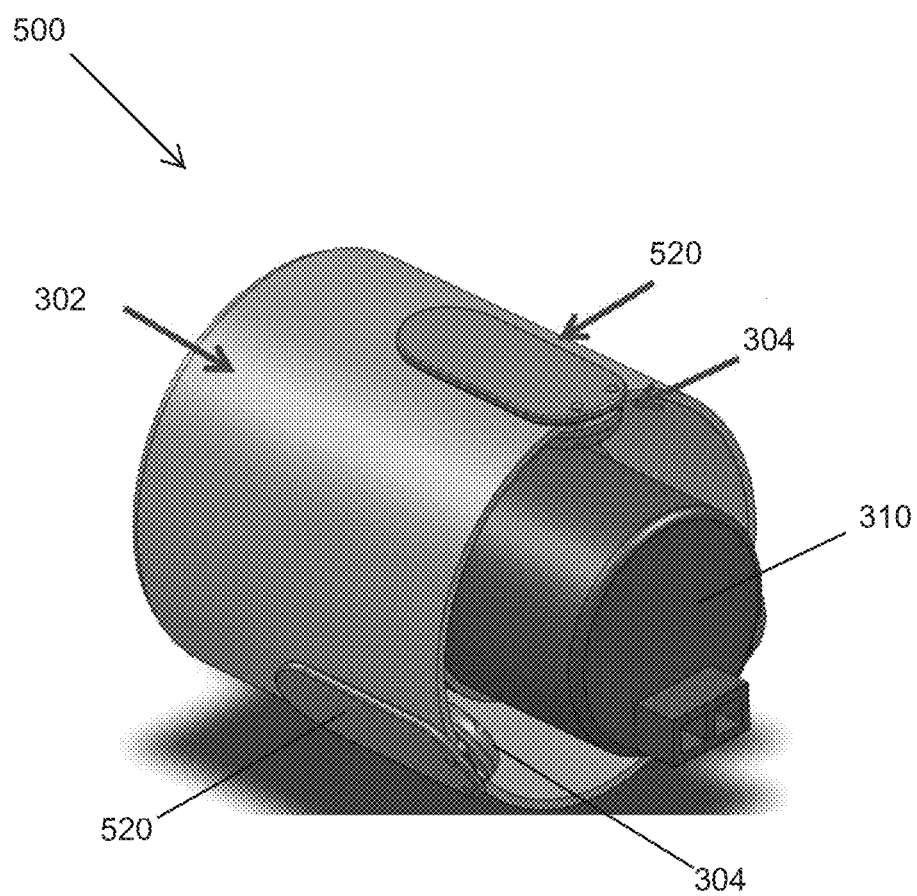
FIG. 5 is another example of a cylinder arrangement of the present invention.
Figure 6:
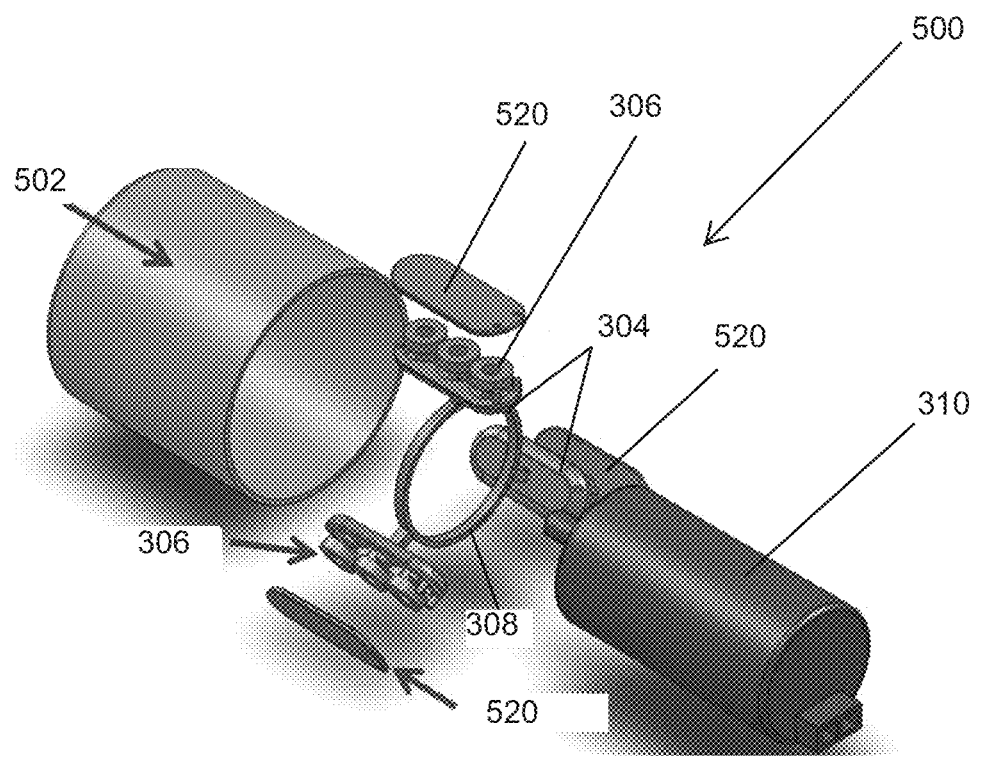
FIG. 6 is an exploded view of the cylinder arrangement of FIG. 5.

FIG. 5 is another example of a cylinder arrangement 500 of the present invention. FIG. 6 is an exploded view of the cylinder arrangement of FIG. 5. FIG. 5 illustrates a single coil arrangement. Coils 306 are opposed in this arrangement by force plates 520 on the opposing side of the cylinder 302. The force plates 520 are bonded to the coils 306 when charged to rotate the cylinder 302. The arrangement illustrated in FIGS. 5 & 6 operates in the same manner as the arrangement in FIGS. 3 & 4. The construction of the design in FIGS. 5 & 6 is light, flatter and less costly to manufacture than the design in FIGS. 3 & 4 and may be well-suited for certain applications.

Figure 7:
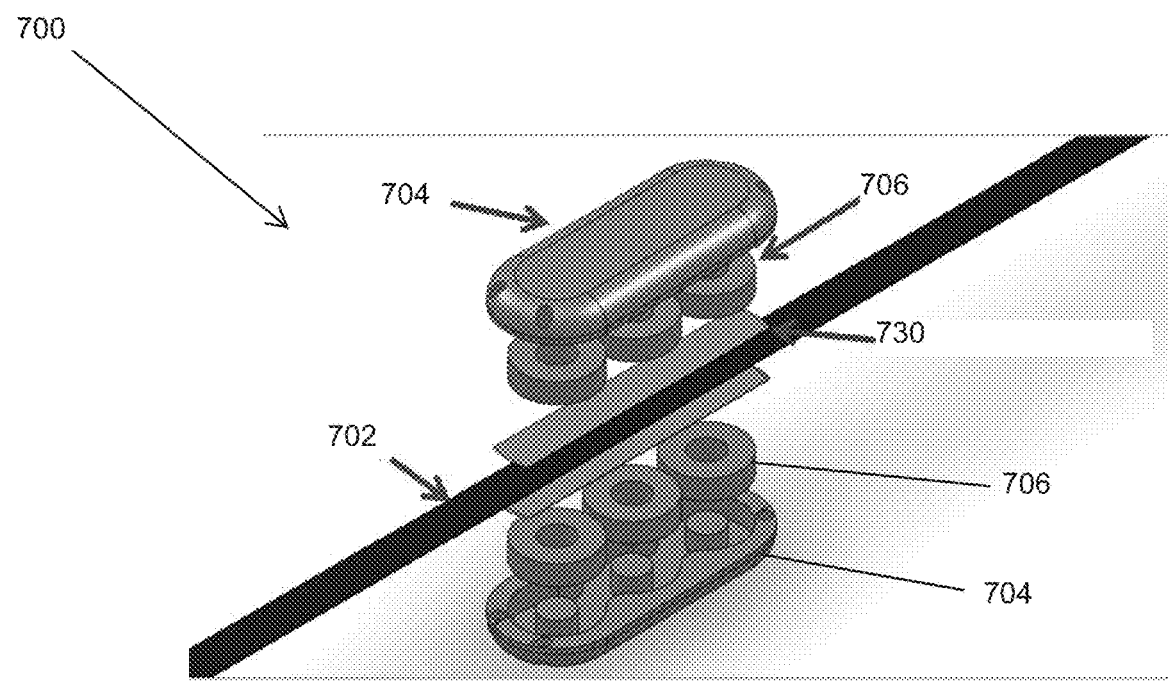
FIG. 7 illustrates another example of a mechanical transfer system of the present invention that uses a belt arrangement.
Figure 8:
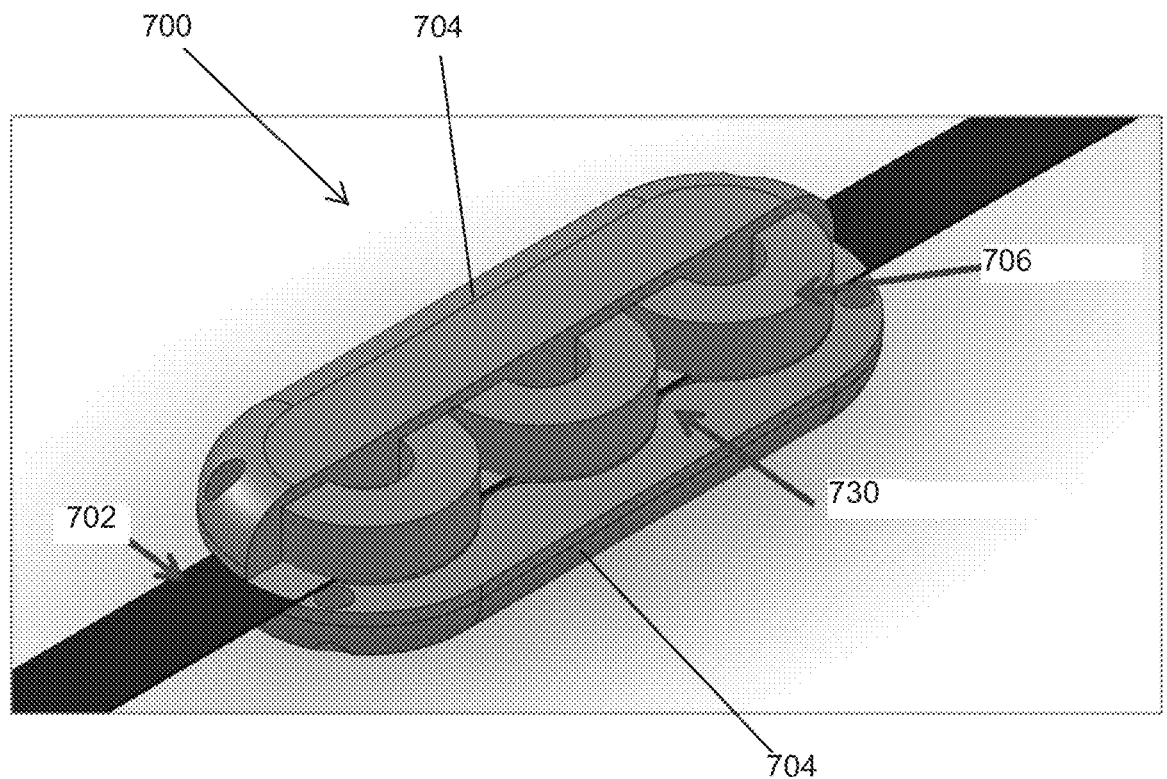
FIG. 8 illustrates the belt arrangement assembly of FIG. 7.
Figure 9:
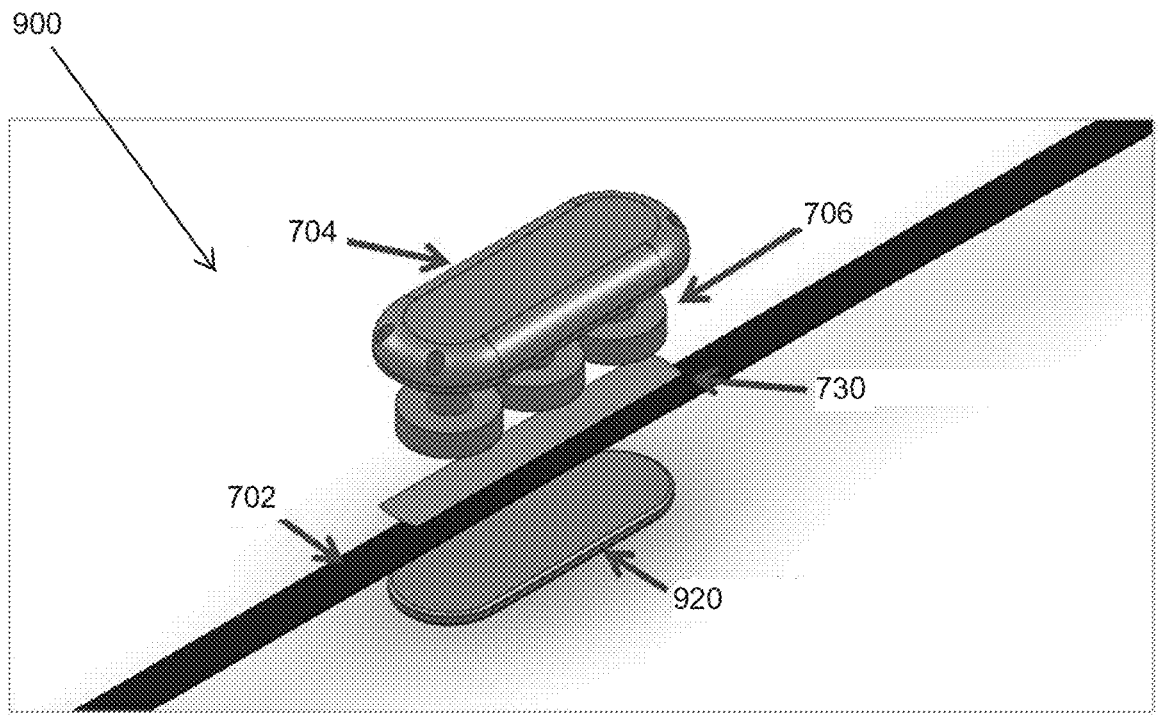
FIG. 9 is an exploded view of yet another example of a belt arrangement of e mechanical transfer system of the present invention.

Similar approaches may be used with belts 702, as shown in connection with FIGS. 7-14 below. FIGS. 7-9 illustrate the use of a belt 702 where the force is applied to the belt 702 by the engagement member (or carrier) 704 with electro-mechanical force and, FIGS. 10-14 illustrate the use of a belt 702 where the force it applied to the belt 702 by the engagement member (or clamping mechanism) 704 using mechanical force.

In particular, FIG. 7 illustrates an exploded view of one example of a mechanical transfer system 700 of the present invention that utilizes a belt arrangement. FIG. 8 illustrates the assembled belt arrangement of FIG. 7.

In this example, the rotating bands or belts 702 are engaged via engagement members 704, which in this example, are magnetic clamps 704 that are electronically controlled. As the rotating bands 702 are moved, engagement members bers 704 may be coupled to the rotating bands 702 by friction resulting in movement of the engagement members 704. The engagement and disengagement of the friction engagement members 704 results in a repetitive motion that can be used by coupling rods or ligatures to move appendances or grips on a robot or robotic arm, for example.

As shown in FIGS. 7 & 8, the engagement members 704 may be electrically controlled clamps on the rotating band 702. When electronically engaged, the engagement members 704 move linearly on the moving band 702 and when deactivated releases the band 702. Engagement members 704 may be biased in a first position by a biasing means, such as a spring or rubber band member that may be extended when engaged with the rotating band 702 to a second position and returned to a first position when the engagement members 704 is released.

Further, as illustrated in FIGS. 7 & 8, friction plates 730 may be used to vary the coefficient of friction, which can vary depending upon the material used as require or desired for particular applications. Movement can further be controlled by the elasticity of the band or belt 702, as desired for different applications.

In this example, a double electrical coil 706 is shown that when energized with electrical current, results in the clamping force being exerted upon the moving band 702. While FIGS. 7 & 8 illustrated a multiple coil approach, FIG. 9 illustrates a single coil approaches that may be employed depending upon the application needs. The single coil design is light, flatter and less costly to manufacture than the design in FIGS. 7 & 8 and may be well-suited for certain applications.

In particular, FIG. 9 is an exploded view of the single coil a belt arrangement 900 of the mechanical transfer system of the present invention. As illustrated in FIG. 9, rather than having coils 706 and carriers 704 on each side of the belt 702 a force plate 920 is positioned on one side of the belt 702. The force plate 520 is attracted to the coils 706 when charged to move the carrier 704 linearly along the belt 702. Like the arrangement of FIGS. 5 & 6, the arrangement illustrated in FIG. 9 operates in the same manner as the arrangement in FIGS. 5 & 6.

Figure 10:
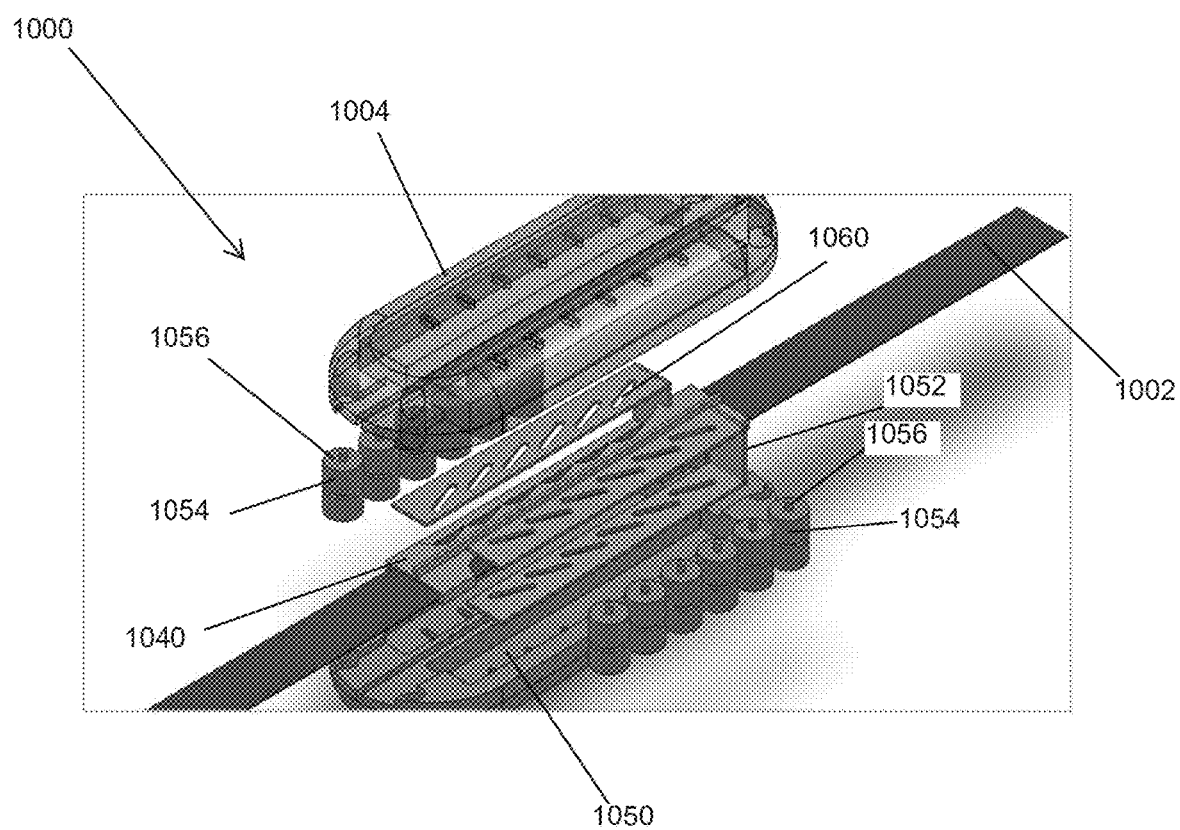
FIG. 10 is an exploded view of still another example of a belt arrangement of the present invention that allows for the application of friction to the carrier.

Rather than use friction resulting from magnets, mechanical friction may also be used to transfer movement to the engagement members 1004, as illustrated in FIGS. 10-14. In particular, FIG. 10 is an exploded view of a belt arrangement 1000 that uses mechanical friction to transfer energy to the engagement members 1004.

In the configuration illustrated in FIGS. 10-14, a central belt 1002 is moving through the engagement member (or clamp) 1004. Side-wheels 1054 are positioned within the clamp 1004 that move toward and away from the belt 1002. When moved toward the belt 1002, the wheels 1054 become engaged with the belt 1002 and the belt 1002 is deformed, creating friction within the clamp 1004. The amount of friction applied to the belt 1004 can be proportionally controlled by the movement of the side wheels 1054 closer or further from the center of the clamp 1004, effectively creating a variable load against the belt (or moving member) 1002, resulting in a variable force against the clamp 1004.

In this example, the clamp includes recesses 1050 for receiving the wheels 1054. The wheels are positioned in guides 1052 within the recesses 1050 that have a series of angled slots 1060. The wheels have pins 1056 extending upward and/or downward from the tops and bottoms of the wheels to engage the slots 1060 in the guides 1052. A motor or solenoid (not shown) can then be used to control the movement of the wheels 1054 toward and/or away from the belt 1002 along the slots 1060. The belt 1002 is guided through the carrier by upper and lower plates 1040.

Figure 11:
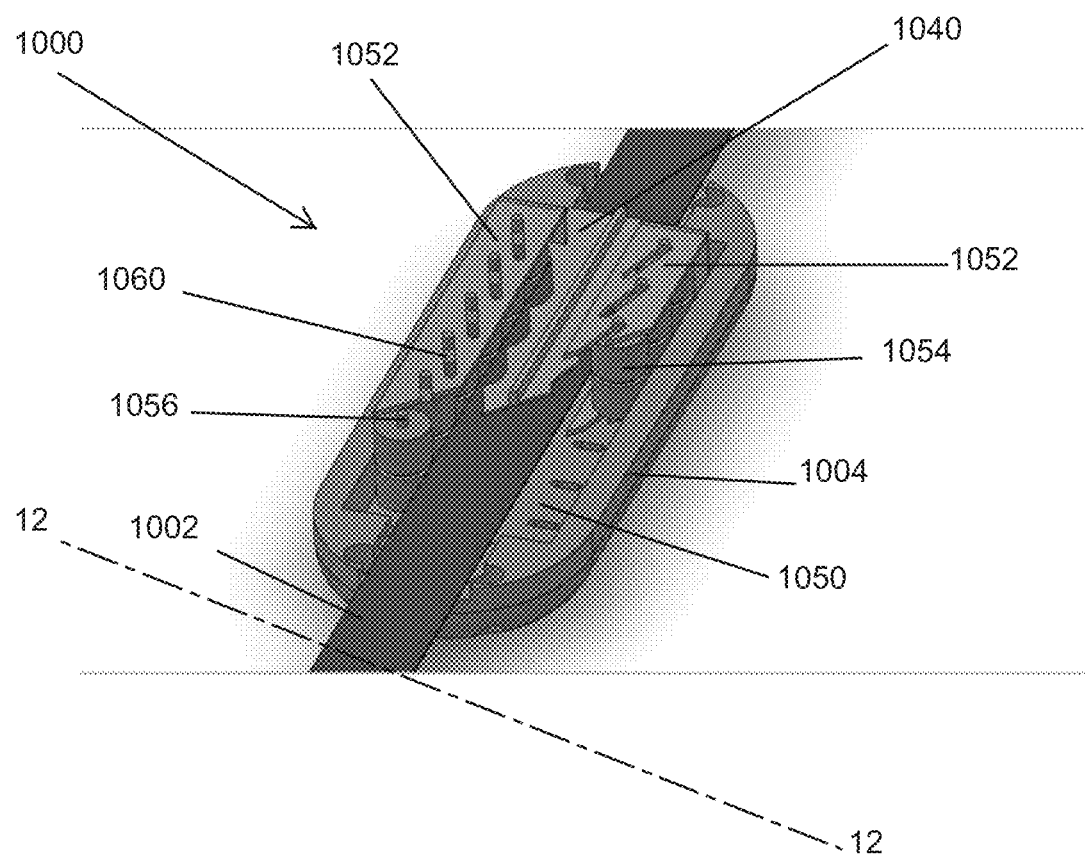
FIG. 11 shows a cut-away view of the belt assembly of FIG. 10 illustrating the belt moving through the carrier with little or no resistance.
Figure 12:
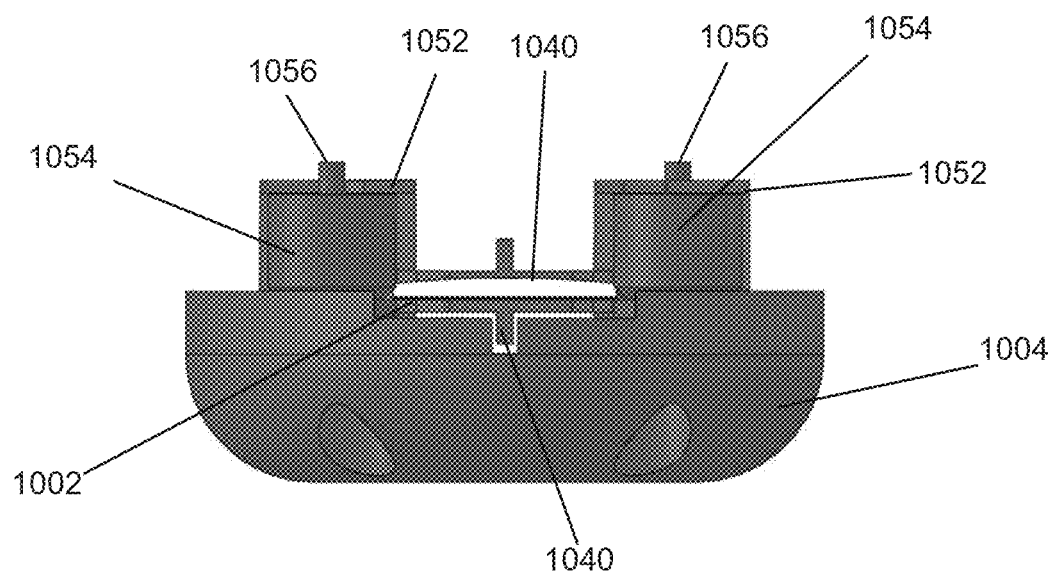
FIG. 12 is a cross-section view of FIG. 11 taken along lines 12-12 of FIG. 11.

FIG. 11 shows a cut-away view of the belt assembly 1000 of FIG. 10 illustrating the belt moving through the carrier 1004 with little or no resistance. In this example, the wheels 1054 are positioned away from the belt 1002. The pins 1056 are positioned at a point in the slots 1060 furthest from the belt 1002. FIG. 12 is a cross-section view of FIG. 11 taken along lines 12-12 of FIG. 11. As illustrated, no resistance is placed on the belt 1002 when the wheels 1054 are positioned at the furthest point away from the belt 1002.

Figure 13:
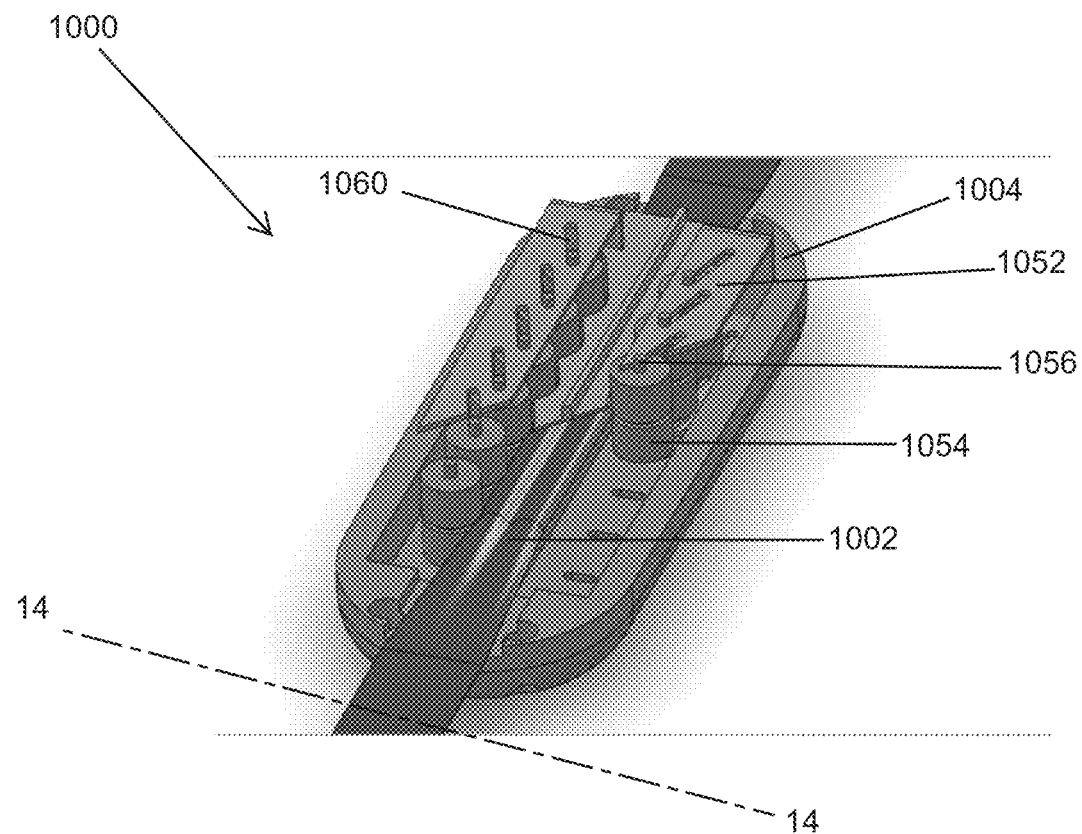
FIG. 13 is a cut-away view of the belt assembly of FIG. 10 illustrating the deformation of the belt as it moves through the carrier with resistance applied.

FIG. 13 is a cut-away view of the belt assembly 1000 of FIG. 10 illustrating the deformation of the belt 1002 as it moves through the carrier 1004 with resistance applied. In this example, the wheels 1054 are positioned near the belt 1002. The pins 1056 are positioned at the point along the slots 1060 closest to the belt 1002.

Figure 14:
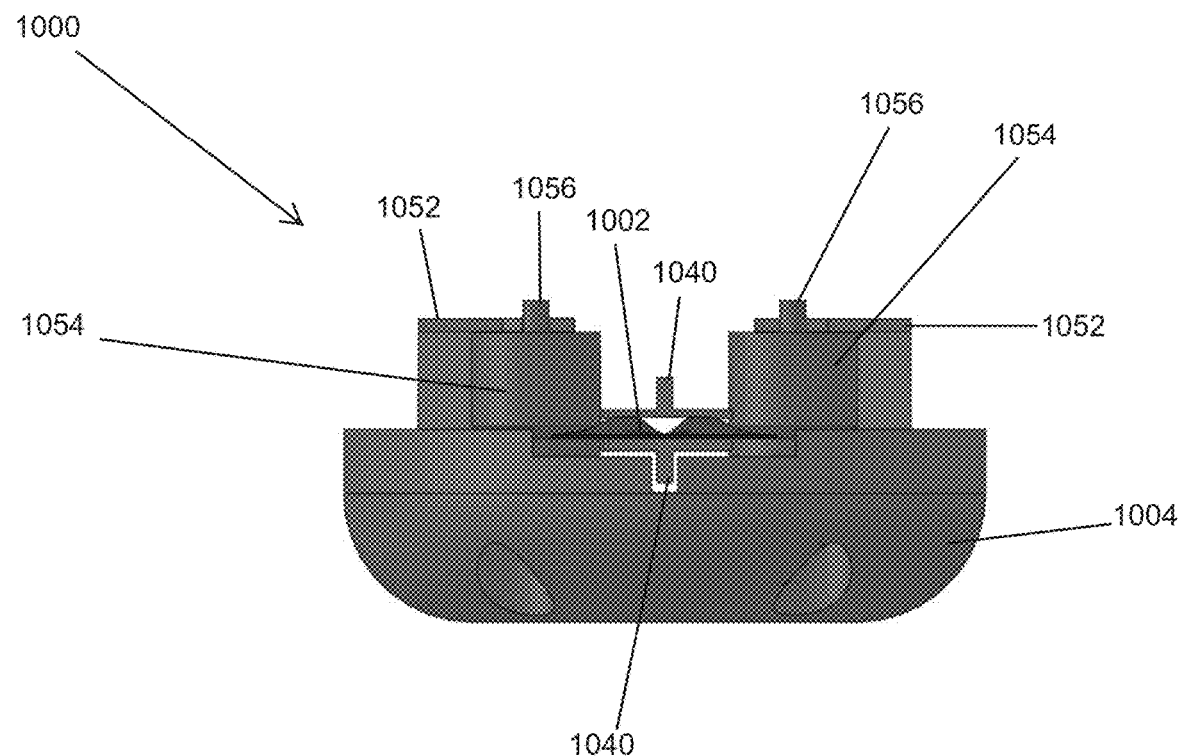
FIG. 14 is a cross-section view of the belt arrangement of FIG. 13 taken along lines 14-14 of FIG. 13.

FIG. 14 is a cross-section view of FIG. 13 taken along lines 14-14 of FIG. 13. As illustrated, resistance is placed on the belt 1002, causing the belt to deform, when the wheels 1054 are positioned nearest the belt 1002. While these illustrate the two extreme positions, completely open and completely engaged, it is understood that force on the belt 1002 may be varied by positioning the wheels 1054 between the points along the slots 1060 illustrated in FIGS. 11 and 13.

An additional configuration or solution not illustrated would be altering the properties of the two engaging members to change the amount of friction applied between the two engaging members, such as the application of lubricants or materials that will alter the amount of force transferred between the members. In this manner, the coefficient of friction may be alerted or controlled for different applications.

FIG. 15 illustrates an example of the use of a belt arrangement mechanical transfer system 1500 as it may appear in use with a robotic arm. This illustration demonstrates a high density of degrees of freedom off a single drive motor (driving the belts). Note that a given belt 1002 can carry several engagement members (clamps) 1004 and each clamp 1004 can move linearly independent of the other clamps 1004 on the same belt 1002, or can optionally, move together. Mechanical limits and controls are placed on the movement of the clamps 1004 to prevent interference or contact with adjacent clamps 1004.

In FIG. 15 multiple belts 1002 are shown, but for illustration purposes, only one of the belts 1002 has been depicted with clamps 1004 that, when engaged, transfer the belt 1002 motion to the digits of the hand by movement of the clamps 1004. In operation, each clamp 1004 would have one or more cables (not shown) that would couple with each digit of the hand/joint to enable movement of the hand as the clamping device 1004 moves.

It is to be further understood that the present invention is not limited to the particular methodology, compounds, materials, manufacturing techniques, uses, and applications, described herein, as these may vary. The present invention is intended to be defined by the scope of the claims and capture variations on the above implementations that provide a damping force on a moving object to confer (through the application of friction) movement to the clamping component.

Accordingly, the present invention further includes a method for moving an element, such as the digit of a robot, the method including the step of applying frictional force to a moving component, such as a belt, disk or cylinder, to impart movement on the element applying the force. The movement applying the force may be a device designed to engage the moving component by magnetic or mechanical force.

It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art.

Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

Features that are described in the context of separate embodiments may also be provided in combination in a single embodiment. Conversely, various features which are, for brevity, described in the context of a single embodiment, may also be provided separately or in any suitable subcombination. The applicants hereby give notice that new claims may be formulated to such features and/or combinations of such features during the prosecution of the present Application or of any further application derived there from.

References to an "example," "implementation" or "embodiment" may indicate that the invention so described may include a particular feature, structure, or characteristic, but not every example, implementation or embodiment necessarily includes the particular feature, structure, or characteristic. Further, repeated use of the phrases "in one example," "in one implementation," or "in one embodiment," do not necessarily refer to the same example, implementation or embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is further recognized the invention may be operated and controlled by a computer or computer system having control circuitry that may further include software designed specifically for the desired application to control the operation of the mechanical transfer system. Further, while robots that may be used in connection with the present invention are generally controlled by step motors and driver board, the unique arrangement of the present invention allows for the operation of the mechanical transfer system by pulse width modulation only.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer system" may refer to a system having one or more computers, where each computer may include computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a compute system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagrarn protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

An algorithm is generally considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, teinis, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In a similar manner, the term "processor" or "controller" may refer to any device or portion of a device that processes electronic data from registers and/or memory to transform that electronic data into other electronic data that may be stored in registers and/or memory. A "computing platform" may comprise one or more processors.

It will be understood, and is appreciated by persons skilled in the art that the operation of the mechanical transfer system of the present invention may be controlled by hardware and/or software (machine readable instructions). If the process is performed by software, the software may reside in software memory (not shown) in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions.

Embodiments of the invention may also be implemented in one or a combination of hardware, firmware, and software. They may be implemented as instructions stored on a machine-readable medium, which may be read and executed by a computing platform to perform the operations described herein.

In the context of this disclosure, a "computer-readable medium" is any tangible means that may contain or store the program for use by or in connection with the instruction execution system, apparatus, or device. The tangible computer-readable medium may selectively be, for example, but is not limited to, an electronic, magnetic, optical, electromagnetic, infrared, or semiconductor system, apparatus or device. More specific examples, but nonetheless a non-exhaustive list, of tangible computer-readable media would include the following: a portable computer diskette (magnetic), a random access memory (RAM) (electronic), a read-only memory (ROM) (electronic), an erasable programmable read-only memory (EPROM or Flash memory) (electronic) and a portable compact disc read-only memory (CDROM) (optical). Note that the computer-readable medium may even be paper (punch cards or punch tape) or another suitable medium upon which the instructions may be electronically captured, then compiled, interpreted or otherwise processed in a suitable manner if necessary, and stored in a computer memory.

The foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A mechanical energy transfer system for controlling the movement of robotic parts, comprising:
    a moving member; and
    a plurality of engaging members that, when engaged with the moving member, imparts a clamping force on the moving member that confers movement of the moving member to the plurality of engaging members through the application of friction, whereby each of the plurality of engaging members can apply a clamping force on the moving member independent of one another.

2. The mechanical energy transfer system of claim 1 where the clamping force is an electromagnetic force.

3. The mechanical energy transfer system of claim 1 where the clamping force is a mechanical frictional force.

4. The mechanical energy transfer system of claim 1 where the moving member is a belt.

5. The mechanical energy transfer system of claim 1 where the moving member is a disk.

6. The mechanical energy transfer system of claim 1 where the moving member is a cylinder.

7. The mechanical energy transfer system of claim 1 where at least one of the plurality of engaging members is positioned on each side of the moving member and where each of the plurality of engaging members includes coils for applying an electromagnetic force to the moving member.

8. The mechanical energy transfer system of claim 1 where at least one of the plurality of engaging members is positioned on at least one side of the moving member and where a magnetic plate is positioned on the other side of the moving member for applying an electromagnetic force to the moving member.

9. The mechanical energy transfer system of claim 1 where the moving member is a belt and the engaging member is positioned around the belt such that the belt runs through the engaging member, and where the engaging member includes movable rollers that apply friction to the belt as it moves through the engaging member thereby imparting movement on the engaging member.

10. The mechanical energy transfer system of claim 1 where the moving member is a belt and the engaging member is positioned around the belt such that the belt runs through the engaging member, and where the engaging member includes electromagnetic coils that apply friction to the belt as it moves through the engaging member thereby imparting movement on the engaging member.

11. A mechanical energy transfer system, comprising:
a moving member;
a plurality of engaging members that, when engaged with the moving member, imparts an electromagnetic force on the moving member that confers movement of the moving member to the plurality of engaging members through the application of the electromagnetic force, and where the plurality of engaging members includes at least one coil on one side of the moving member and where the system further includes an opposing magnetic force on the other side of the moving member to create the electromagnetic force when the at least one coil is charged, whereby each of the plurality of engaging members can apply a clamping force on the moving member independent of one another.

12. The mechanical energy transfer system of claim 11 where the moving member is selected from the group consisting of a belt, a disk or a cylinder.

13. The mechanical energy transfer system of claim 11 where the opposing magnetic force is a coil.

14. The mechanical energy transfer system of claim 11 where the opposing magnetic force is a magnetic plate.

15. The mechanical energy transfer system of claim 11 where each of the plurality of electromagnetic forces can be varied independently of one another to control the amount of movement imparted from the moving member to each of the plurality of engaging members.

* * * * *